Patented July 17, 1923.

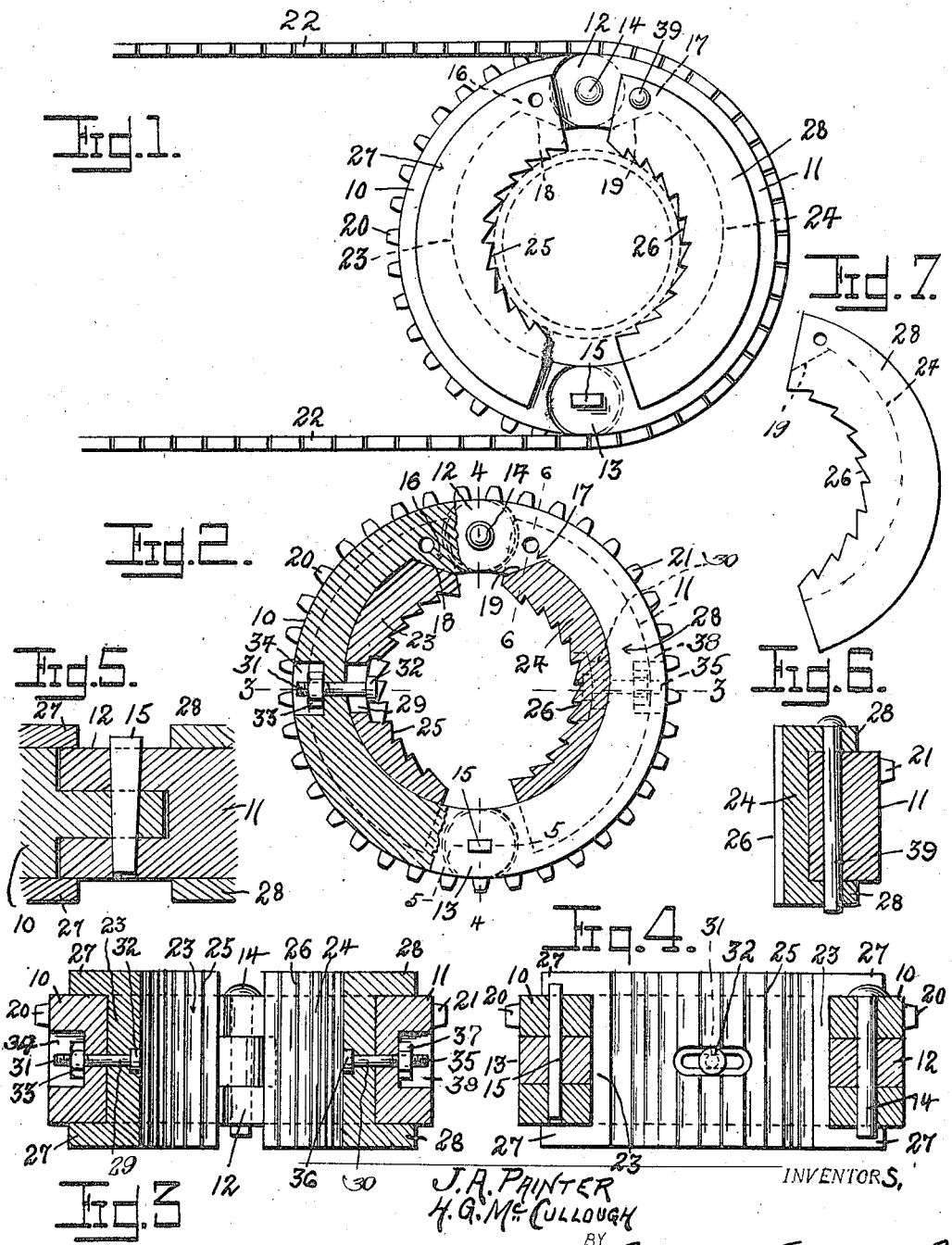

1,462,377

UNITED STATES PATENT OFFICE.

JOHN A. PAINTER, OF HOMINY, OKLAHOMA, AND HARVEY GLENN McCULLOUGH, OF ANGOLA, NEW YORK.

PIPE CLAMP AND WRENCH.

Application filed March 24, 1922. Serial No. 546,226.

*To all whom it may concern:*

Be it known that we, JOHN A. PAINTER and HARVEY GLENN McCULLOUGH, citizens of the United States, residing at Hominy, in the county of Osage and State of Oklahoma, and at Angola, in the county of Erie and State of New York, respectively, have invented certain new and useful Improvements in Pipe Clamps and Wrenches, of which the following is a specification.

This invention relates to pipe or rod wrenches or grips, more particularly to devices of this character adapted for heavy pipe fittings, for instance in underground conduits or the like, and has for one of its objects to simplify and improve the construction and produce a device which is positive in its action and which may be readily applied and operated from a distance, thereby providing for its use in confined spaces where an ordinary wrench cannot be employed.

Another object of the invention is to provide a device of this character which may be quickly reversed in its action without detaching any of the parts.

Another object of the invention is to provide a device of this character having means whereby either of the gripping jaws may be locked in inoperative position.

With these and other objects in view the invention consists in certain novel features of construction as hereinafter shown and described and then specifically pointed out in the claims, and in the drawings illustrative of the preferred embodiment of the invention—

Fig. 1 is a side elevation of the improved device,

Fig. 2 is a side elevation partly in section,

Fig. 3 is a section on the line 3—3 of Figure 2,

Fig. 4 is a section on the line 4—4 of Figure 2,

Fig. 5 is a sectional detail in section on the line 5—5 of Figure 2,

Fig. 6 is a sectional detail on the line 6—6 of Figure 2.

Fig. 7 is a view of the gripping jaw 24 with the teeth reversed.

The improved device comprises a band or body formed in two semi-circular portions 10 and 11 with knckle joints 12 and 13 at the ends, the overlapping portions of the knuckles 12 united by a pivot pin or pintle 14 and the overlapping portions of the knuckle 13 apertured to receive a wedge key 15. By this means the two members 10 and 11 are firmly united, but may be released to swing laterally one on the other by withdrawing the wedge key.

The wedge key likewise provides simple means for rigidly uniting the parts and preventing rattling or looseness.

The inner faces of the band members 10 and 11 are eccentric to their outer faces, the latter comprising a complete circle when the parts are united by the wedge key 15 and the pintle 14 as shown in Figure 1. The parts forming the knuckle portion 12 are directed inwardly to form abutments 16 and 17 as shown in Figures 1 and 2, with their inner faces bevelled as indicated at 18 and 19.

The members 10 and 11 are provided respectively with sprockets or teeth 20 and 21 to receive an operating chain 22, whereby the grip device may be forcibly rotated, as hereafter explained.

Fitting within the eccentric inner face of the member 10 is a segmental wedge shaped grip member 23, while a reversely formed wedge shaped grip member 24 fits against the eccentric inner face of the member 11, the curvatures of the inner faces of the members 10 and 11 corresponding to the curvatures of the wedge members so that the wedge shaped members move freely within the band members.

The inner faces of the grip members are concentric to the outer faces of the band members 10 and 11, and are provided with gripping teeth 25 and 26 reversely arranged, as shown in Figures 1 and 2.

The thicker ends of the grip members 23 and 24 are bevelled to correspond to the bevels 18 and 19 of the abutments 16 and 17, so that when the grip members are in their withdrawn position, as shown in Figures 1 and 2, the bevelled ends of the grip members will bear against the bevelled faces of the abutments.

The member 23 is formed with outwardly directed flanges 27, which project over the opposite faces of the member 10, while like flanges 28 are formed on the member 24 and extend over the opposite faces of the band member 11. By this means the grip members are retained in position upon the band members while free to move circumferentially relative thereto.

The grip member 23 is provided with a longitudinally directed slot 29, while a similar slot, indicated at 30, is formed through the grip member 24.

A bolt 31 extends through the band member 10 and likewise through the slot 29 of the grip member 23 and is provided with a head 32 bearing against the member 23 at the sides of the slot 29, the bolt being provided with a nut 33 engaging in a recess 34 in the outer face of the member 10.

A similar bolt 35 extends through the band member 11 and likewise through the slot 30 of the grip member 24 and is provided with a head 36 bearing against the member 24 at the sides of the slot 30, the bolt 35 being provided with a nut 37 engaging in a recess 38 in the outer face of the band member 11.

By this means the grip members are loosely coupled to the band members, so that they will not drop out when the band members are separated as will be obvious.

Formed through the flanges 27 and the intervening portion of the band member 10 are registering apertures to receive a locking pin 39, while similar registering apertures are formed through the flanges 28 and the intervening portion of the band member 11 to receive a similar locking pin, or the same pin 39. By this means, either or both of the grip members may be locked in withdrawn position if required.

By this arrangement when a pipe or rod is to be rotated, either in separating or coupling, the wedge key 15 is removed and the band members separated to a sufficient extent to enable them to be disposed around a pipe, rod, or other object to be gripped, and the wedge key reinserted with the teeth 25 and 26 directed in the proper direction to cause them to grip the pipe or rod when the band is rotated in the same direction.

Thus when the object is to be rotated in a clockwise direction, the device is disposed around the object with the teeth pointing towards the direction in which the object is to be turned. If the object is to be rotated in an anti-clockwise direction, the device will simply be reversed in position on the object, and when operated the teeth will grip the same.

Under some circumstances, only one of the grip members is required, and in the event thereof, one of the locking pins 39 will be inserted, as before described.

The improved device is simple in construction, can be manufactured of any suitable material and of any required strength, and to fit pipes of various sizes, as will be obvious.

The chain 22 may be operated by any suitable power, such as an electric motor, an internal combustion motor, or other power, or the united band member may be actuated by any power other than a chain, as required, and it is not desired to limit the power to a chain drive.

It may be of advantage under some circumstances to employ an extra jaw member 24, with the teeth reversed as shown in Figure 7, to enable the pipe or rod to be rotated in a clockwise or in an anti-clockwise direction without reversing the wrench.

A pipe clamp and wrench in accordance with this invention is designed primarily for use in connection with pipe or casing sections in oil well pumping and drilling operations, but it is obvious that the device can be employed for any purpose for which it is found adaptable, and although the preferred embodiment of the invention is as disclosed by the drawing and set forth in the foregoing description, it will be understood, however, that changes in the details of construction can be had which will fall within the scope of the invention as claimed.

Having thus described the invention, what is claimed as new is:—

1. A device for the purpose set forth comprising a revolvable hollow annular body portion formed of a pair of sections hingedly connected at one end and detachably connected together at their other end, each of said body sections having the major portion of its inner face eccentrically disposed with respect to its outer face and formed with an inwardly extending abutment at its hinged end, oppositely disposed segment shaped toothed gripping members each slidably positioned against the eccentric portion of the inner face of each section and normally positioned against an abutment, a bolt and slot connection between each gripping member and a body section intermediate the ends thereof, and means for detachably connecting one end of a gripping member to a body section when the other gripping member is active.

2. A device for the purpose set forth comprising a revolvable hollow annular body portion formed of a pair of sections hingedly connected at one end and detachably connected together at their other end, each of said body sections having the major portion of its inner face eccentrically disposed with respect to its outer face and formed with an inwardly extending abutment at its hinged end, oppositely disposed segment shaped toothed gripping members each slidably positioned against the eccentric portion of the inner face of each section and normally positioned against an abutment, each of said members provided with a pair of flanges overlapping that body section against which it is positioned, a bolt and slot connection between each gripping member and a body section intermediate the ends thereof, and means for detachably connecting one end of a gripping member to a body section when the other gripping member is active.

3. A device for the purpose set forth comprising a revolvable hollow annular body portion formed of a pair of sections hingedly connected at one end and detachably connected together at their other end, each of said body sections having the major portion of its inner face eccentrically disposed with respect to its outer face and formed with an inwardly extending abutment at its hinged end, oppositely disposed segment shaped toothed gripping members each slidably positioned against the eccentric portion of the inner face of each section and normally positioned against an abutment, a bolt and slot connection between each gripping member and a body section intermediate the ends thereof, and means for detachably connecting one end of a gripping member to a body section when the other gripping member is active, the teeth of one gripping member being oppositely inclined with respect to the teeth on the other gripping member.

4. A device for the purpose set forth comprising a revolvable hollow annular body portion formed of a pair of sections hingedly connected at one end and detachably connected together at their other end, each of said body sections having the major portion of its inner face eccentrically disposed with respect to its outer face and formed with an inwardly extending abutment at its hinged end, oppositely disposed segment shaped toothed gripping members each slidably positioned against the eccentric portion of the inner face of each section and normally positioned against an abutment, each of said members provided with a pair of flanges overlapping that body section against which it is positioned, a bolt and slot connection between each gripping member and a body section intermediate the ends thereof, and means for detachably connecting one end of a gripping member to a body section when the other gripping member is active, the teeth of one gripping member being oppositely inclined with respect to the teeth on the other gripping member.

In testimony whereof we affix our signatures hereto.

JOHN A. PAINTER.
HARVEY GLENN McCULLOUGH.